(12) United States Patent
Hinohara et al.

(10) Patent No.: US 8,960,690 B2
(45) Date of Patent: Feb. 24, 2015

(54) REAR WHEEL TOE ANGLE VARIABLE VEHICLE

(71) Applicant: Honda Motor Co., Ltd., Tokyo (JP)

(72) Inventors: Takamichi Hinohara, Wako (JP); Hideki Imafuku, Wako (JP); Kazutaka Saito, Wako (JP); Tadatsugu Takada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/864,556

(22) Filed: Apr. 17, 2013

(65) Prior Publication Data

US 2013/0320642 A1     Dec. 5, 2013

(30) Foreign Application Priority Data

May 30, 2012 (JP) ................................. 2012-122665

(51) Int. Cl.
     *B62D 17/00*      (2006.01)
     *B60G 7/00*      (2006.01)
     *B62D 7/14*      (2006.01)

(52) U.S. Cl.
     CPC ............... *B62D 17/00* (2013.01); *B60G 7/006* (2013.01); *B62D 7/146* (2013.01); *B60G 2200/44* (2013.01); *B60G 2200/462* (2013.01); *B60G 2202/422* (2013.01)
     USPC ..................................... 280/5.524; 280/5.522

(58) Field of Classification Search
     CPC ............................................... B60G 2200/462
     USPC ................... 280/5.522, 5.524, 86.75
     See application file for complete search history.

(56) References Cited

U.S. PATENT DOCUMENTS

| 5,143,400 | A | * | 9/1992 | Miller et al. | ............. 280/5.522 |
| 7,766,345 | B2 | * | 8/2010 | Hakui et al. | ............. 280/5.521 |
| 7,766,350 | B2 | * | 8/2010 | Terada et al. | ........... 280/86.757 |
| 7,871,084 | B2 | * | 1/2011 | Hakui et al. | ............. 280/5.521 |

(Continued)

FOREIGN PATENT DOCUMENTS

| EP | 2517948 A1 * | 10/2012 |
| JP | 2007-314164 A | 12/2007 |

(Continued)

OTHER PUBLICATIONS

Japanese Office Action dated Jan. 28, 2014, issued in Japanese Patent Application No. 2012-122665 (2 pages).

(Continued)

*Primary Examiner* — Nicole Verley
(74) *Attorney, Agent, or Firm* — Westerman, Hattori, Daniels & Adrian, LLP (57) ABSTRACT

A rear-wheel toe angle variable vehicle changes a toe angle of a rear wheel by a rear toe actuator including: a housing connected to one of a rear-wheel support member and a body; a motor in the housing; a rod connected to the other of the rear-wheel support member and the body; a nut provided in one of the housing and the rod; a screw shaft provided in the other of the housing and the rod; a rotation transmission unit in the housing for transmitting rotation of the motor to the nut or screw shaft; and a rotation amount detection unit for detecting a rotation amount of one of the rotation transmission unit and the nut or screw shaft. The vehicle estimates an operation amount of the rear toe actuator based on the detected amount, and performs feedback control of the motor using the estimated amount.

15 Claims, 4 Drawing Sheets

(56) References Cited

U.S. PATENT DOCUMENTS

| | | | |
|---|---|---|---|
| 7,950,301 B2 * | 5/2011 | Yamaguchi | 74/89.23 |
| 7,990,003 B2 * | 8/2011 | Suyama et al. | 310/83 |
| 7,997,596 B2 * | 8/2011 | Yuta et al. | 280/86.758 |
| 8,011,675 B2 * | 9/2011 | Suyama | 280/5.522 |
| 8,050,819 B2 * | 11/2011 | Suyama et al. | 701/37 |
| 8,073,592 B2 * | 12/2011 | Nishimori et al. | 701/39 |
| 8,249,774 B2 * | 8/2012 | Suyama et al. | 701/37 |
| 8,340,867 B2 * | 12/2012 | Maruyama et al. | 701/41 |
| 8,463,506 B2 * | 6/2013 | Yanagi et al. | 701/49 |
| 8,583,328 B2 * | 11/2013 | Mori et al. | 701/42 |
| 2008/0257081 A1 * | 10/2008 | Hakui et al. | 74/89.35 |
| 2010/0019465 A1 * | 1/2010 | Yuta et al. | 280/86.758 |

FOREIGN PATENT DOCUMENTS

| | | | |
|---|---|---|---|
| JP | 2008-068853 A | | 3/2008 |
| JP | 2008-239102 A | | 10/2008 |
| JP | 2009-161079 A | | 7/2009 |
| JP | 2009-161099 A | | 7/2009 |
| JP | 2010-254063 A | | 11/2010 |
| JP | 2011-131859 A | | 7/2011 |
| WO | WO 2011077669 A1 * | | 6/2011 |

OTHER PUBLICATIONS

Japanese Office Action dated Aug. 5, 2014, issued in Japanese Patent Application No. 2012-122665 (2 pages).

* cited by examiner

REAR WHEEL TOE ANGLE VARIABLE VEHICLE

CROSS REFERENCES TO RELATED APPLICATIONS

The present application claims priority under 35 U.S.C. §115 to Japanese Patent Application No. 2012-122665, filed May 30, 2012, entitled "Rear Wheel Toe Angle Variable Vehicle." The contents of this application are incorporated herein by reference in their entirety.

TECHNICAL FIELD

The present disclosure relates to a rear wheel toe angle variable vehicle having a mechanism for variably controlling a rear wheel toe angle, and more particularly, to a technology for stably detecting an operation amount of a rear toe actuator with high accuracy.

BACKGROUND

In recent years, four-wheel vehicles (rear wheel toe angle variable vehicles) have been developed that have a rear wheel toe angle control mechanism in addition to a front wheel steering mechanism, the rear wheel toe angle control mechanism being configured to variably control the toe angles of the left and right rear wheels according to a front wheel steering amount and a vehicle speed, and the front wheel steering mechanism being configured to steer the left and right front wheels according to a rotational operation of a steering wheel by a driver. In a rear wheel toe angle variable vehicle, the left and right rear wheels are steered in-phase or out-phase (toe-in or toe-out) according to an amount of steering operation by a driver and motion state parameters of a vehicle (a vehicle speed, a yaw rate, a lateral acceleration, a longitudinal acceleration). The rear wheel toe angle control mechanism includes a king pin which pivotably supports a knuckle and a hub carrier (hereinafter collectively referred to as a knuckle), and a rear toe actuator which connects the vehicle body to the knuckle. The rear toe actuator is drive-controlled by a rear wheel steering ECU (Electronic Control Unit) (see Japanese Unexamined Patent Application Publication No. 2011-131859).

The rear toe actuator disclosed in Japanese Unexamined Patent Application Publication No. 2011-131859 includes a housing connected to a vehicle body; a rod which is slidably held in the housing with one end of the rod connected to the knuckle; a nut fixed to the inside of the rod; a screw shaft which is rotatably held in the housing and screwed into the nut (that is to say, the screw shaft and the nut constitute a feed screw); a motor which drives the screw shaft via a deceleration mechanism; and a stroke sensor which detects an axial displacement of the rod with respect to the housing. A signal detected by the stroke sensor is outputted to the rear wheel steering ECU which detects (estimates) the actual toe angle based on the detected signal, and performs feedback control on the motor of the rear toe actuator so as to reduce the difference between a target toe angle and the actual toe angle.

SUMMARY

The rear toe actuator disclosed in Japanese Unexamined Patent Application Publication No. 2011-131855 has a problem in that the feedback control is unstable due to axial looseness of the feed screw as described below because a configuration is adopted in which the stroke sensor magnetically detects an axial displacement of the rod. Generally, in order to achieve smooth operation of the feed screw, a predetermined backlash needs to be provided between a female screw of a nut and a male screw of a screw shaft, and therefore occurrence of axial looseness in the feed screw due to the backlash is inevitable. Thus, for example, when an external force is alternately applied to the rear wheels in bad road conditions, the screw shaft moves (or vibrates) in an axial direction with respect to the nut by the degree of the looseness and the actual toe angle is varied, and thus hunting may occur in the feedback control based on the difference between a target toe angle and the actual toe angle.

The present disclosure has been made in view of such a background, and provides a rear wheel toe angle variable vehicle which can stably detect an operation amount of a rear toe actuator with high accuracy.

A first aspect of the embodiments provides a rear wheel toe angle variable vehicle (V) which changes a toe angle of a rear wheel (3) by a rear toe actuator (41) which operates in an expanding or contracting manner in an axial direction, the rear wheel being supported by a rear wheel support member (16), the rear toe actuator including: a housing (45) connected to one of the rear wheel support member and a vehicle body (1); a motor (46) held in the housing; a rod (48) connected to the other of the rear wheel support member and the vehicle body; a nut (47) provided in one of the housing and the rod; a screw shaft (72) which is provided in the other of the housing and the rod, the screw shaft and the nut constituting a feed screw (49); a rotation transmission unit (53, 81) which is held in the housing and configured to transmit rotation of the motor to the nut or the screw shaft and to cause a relative positional change between the nut and the screw shaft in the axial direction; and a rotation amount detection unit (42) configured to detect a rotation amount of one of the rotation transmission unit and the nut or the screw shaft to which the rotation is transmitted by the rotation transmission unit. The rear wheel toe angle variable vehicle estimates an operation amount of the rear toe actuator based on the amount detected by the rotation amount detection unit, and performs feedback control of the motor using the estimated operation amount. Thus, even with axial looseness between the screw shaft and the nut, the feedback control based on the difference between the target toe angle and the actual toe angle can be stably performed.

In addition, a second aspect of the embodiments provides the rear wheel toe angle variable vehicle in which the rotation transmission unit includes a driven gear (53) engaged with a drive gear (52) which is formed on a shaft (51) of the motor, or a planetary gear deceleration mechanism (81) which is driven by the drive gear. Thus, the operation amount of the rear toe actuator can be estimated with high accuracy.

In addition, a third aspect of the embodiments provides the rear wheel toe angle variable vehicle in which the rod is connected to the rear wheel support member without a gear. Thus, adopted configuration is not complicated, while the rod itself is strongly affected by an external force. However, the rotation amount detection unit detects a rotation amount of the rotation transmission unit or the nut (or the screw shaft), and therefore the operation amount of the rear toe actuator can be estimated without being affected by a strong external force. In the above explanation of the exemplary embodiments, specific elements and their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

DETAILED DESCRIPTION

Hereinafter, two embodiments of a rear wheel toe angle variable, vehicle according to the present disclosure will be described in detail with reference to the accompanying drawings. In the following description of the overall configuration, for each of four wheels and members disposed in the wheels, i.e., tires and suspensions, corresponding numeric symbol is labeled with a lowercase subscript which indicates front, rear, left, or right, for example, wheel 3$fl$ (front left), wheel. 3$fr$ (front right), wheel 3$rl$ (rear left), or wheel 3$rr$ (rear right), whereas for each of the members related to the rear wheel toe angle variable mechanism, corresponding numeric symbol is labeled with a lowercase, subscript which indicates left or right, for example, rear toe actuator 41L, (left) or rear toe actuator 41R (right).

First Embodiment

[Overall Configuration of Vehicle]

Figure 1:
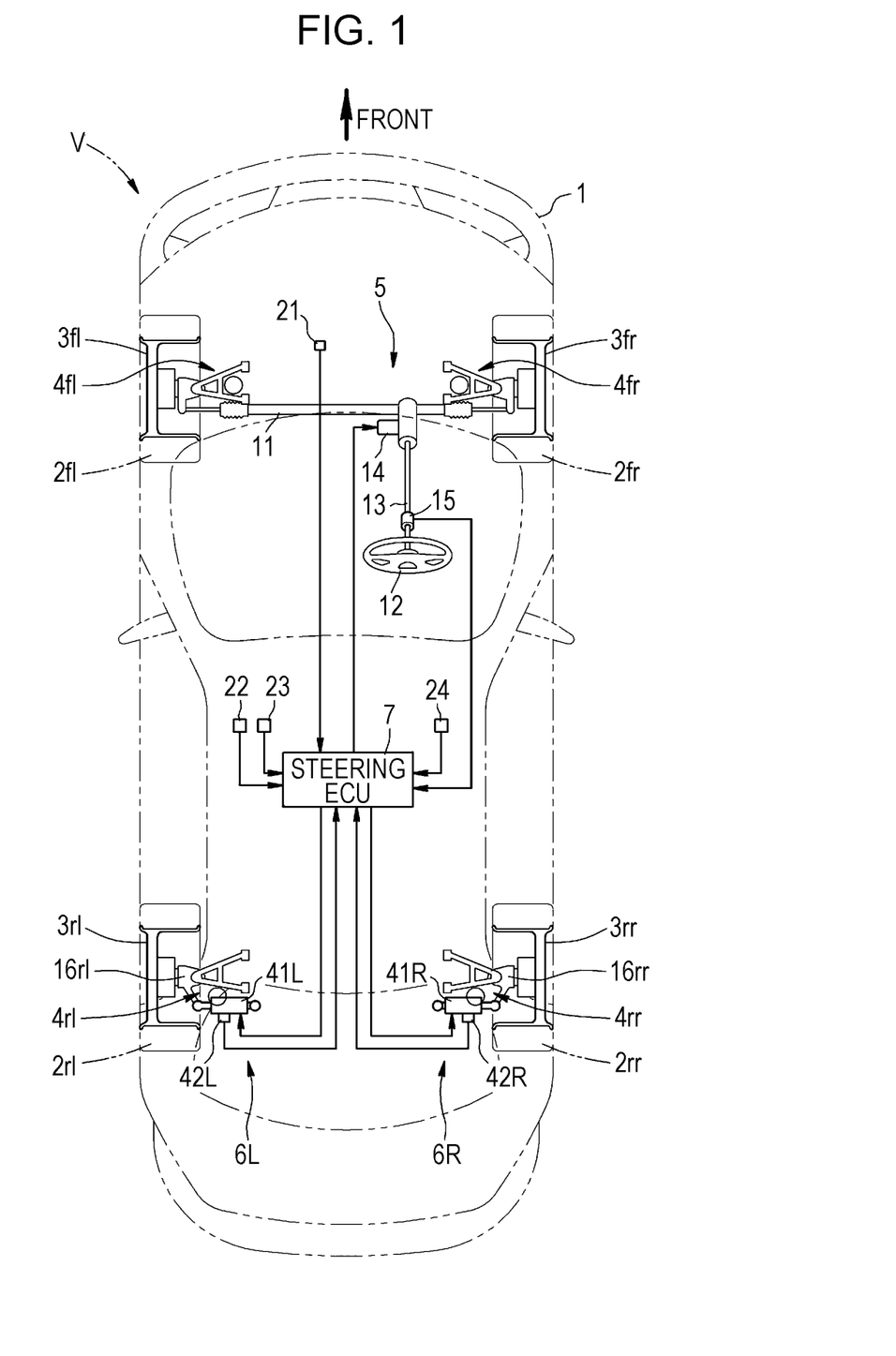
FIG. 1 is a schematic configuration diagram of a rear wheel toe angle variable vehicle according to a first embodiment.

As illustrated in FIG. 1, a wheel 3, on which a tire 2 is mounted, is installed on the front, rear, left, and right sides of a vehicle body 1 of a vehicle V, and each wheel 3 is suspended from the vehicle 1 by a suspension 4 which includes a suspension arm, a spring, and a damper. In the vehicle V, there are installed an EPS (Electric Power Steering) 5 which serves as a steering assist to the left and right front wheels 3$fl$, 3$fr$, rear wheel toe angle variable mechanisms 6L, 6R which respectively serve for steering the left and right rear wheels 3$rl$, 3$rr$, and a steering ECU (Electronic Control Unit) 7 which controls the EPS 5 and the rear wheel toe angle variable mechanisms 6L, 6R.

The EPS 5 includes the main components of a steering wheel gear 11 including a rack and a pinion (not illustrated), a steering shaft 13 with its rear end attached to a steering wheel 12, and an EPS motor 14 which supplies a steering assistance power to the steering shaft 13 in which a steering angle sensor (steering angle detection unit) 15 is installed. On the other hand, the rear wheel toe angle variable mechanisms 6L, 6R respectively include direct-driven rear toe actuators 41L, 41R interposed between the vehicle body 1 and rear wheel knuckles 16$rl$, 16$rr$, and rotation sensors 42L, 42R for detecting operation amounts of the rear toe actuators 41L, 41R, respectively. Furthermore, in the vehicle V, there are installed a vehicle speed sensor 21 for detecting a vehicle speed, as well as a lateral G sensor 22 for detecting a lateral acceleration, a yaw rate sensor 23 for detecting a yaw rate, and a longitudinal G sensor 24 for detecting a longitudinal acceleration in proper positions of the vehicle body 1.

The steering ECU 7 includes a microcomputer, a ROM, a RAM, a peripheral circuit, an input/output interface, and various drivers. The steering ECU 7 is connected to sensors 15, 21 to 24, 42, the EPS motor 14, and the rear wheel toe angle variable mechanisms 6L, 6R via communication lines (CAN (Controller Area Network) in the present embodiment). The steering ECU 7 then sets an assistance power to the front wheels and a target value of the rear wheel toe angle based on input signals from the sensors 15, 21 to 24, 42, then performs feedback control of the EPS 5 and the rear toe actuators 41L, 41R.

[Rear Wheel Toe Angle Control Mechanism]

Next, the configuration of the rear wheel toe angle control mechanism of the left rear wheel will be described with reference to FIG. 2. Because the rear suspension and the rear wheel toe angle variable mechanism have a symmetrical structure in the left rear wheel and the right rear wheel, notations such as the rear wheel knuckle 16, and the rear toe actuator 41 without a subscript are used in order to avoid complicated notations in the following description of the rear wheel toe angle variable mechanisms and the rear toe actuators (FIG. 3).

Figure 2:
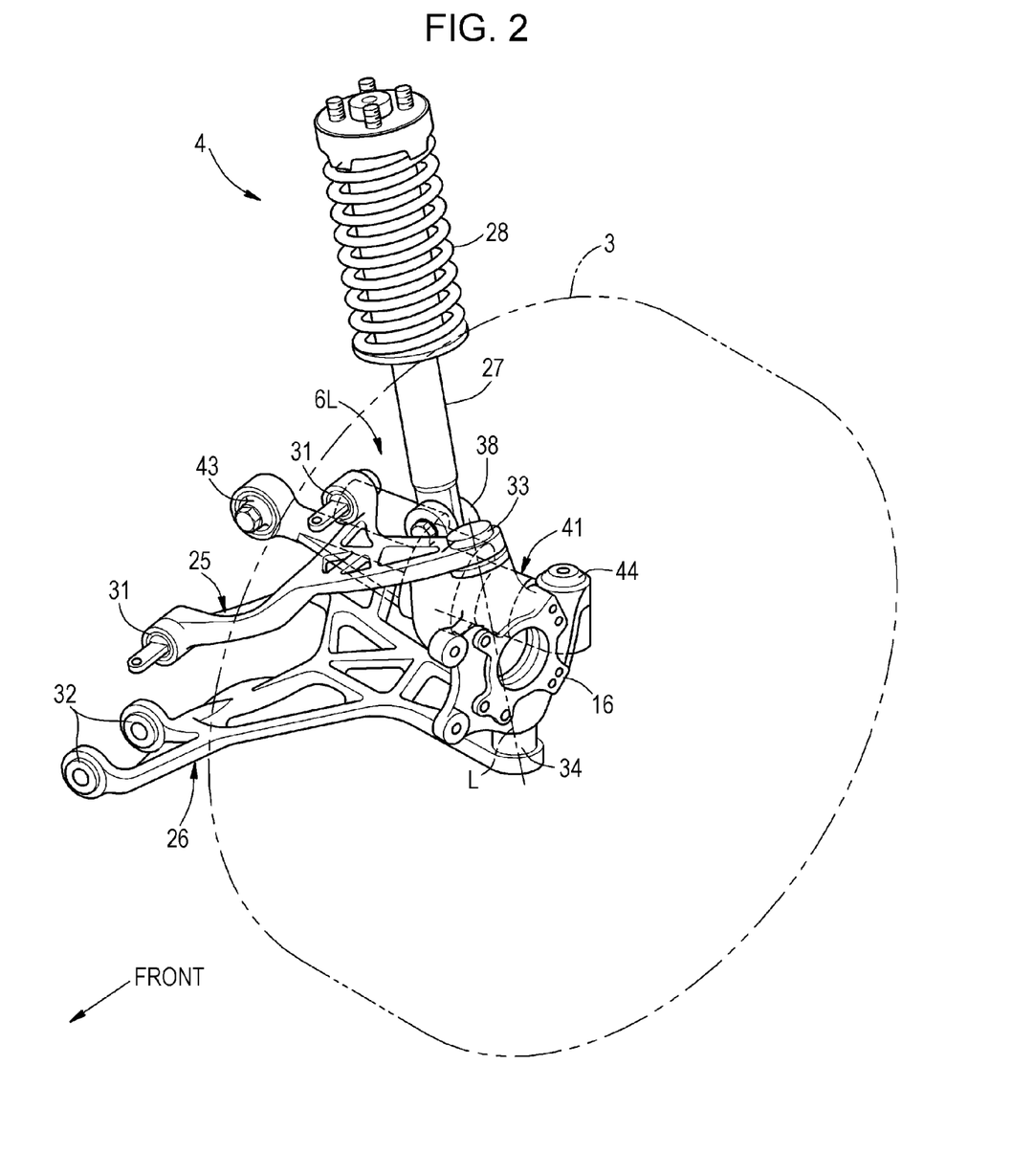
FIG. 2 is a perspective view illustrating a rear wheel toe angle variable mechanism according to the first embodiment.
Figure 3:
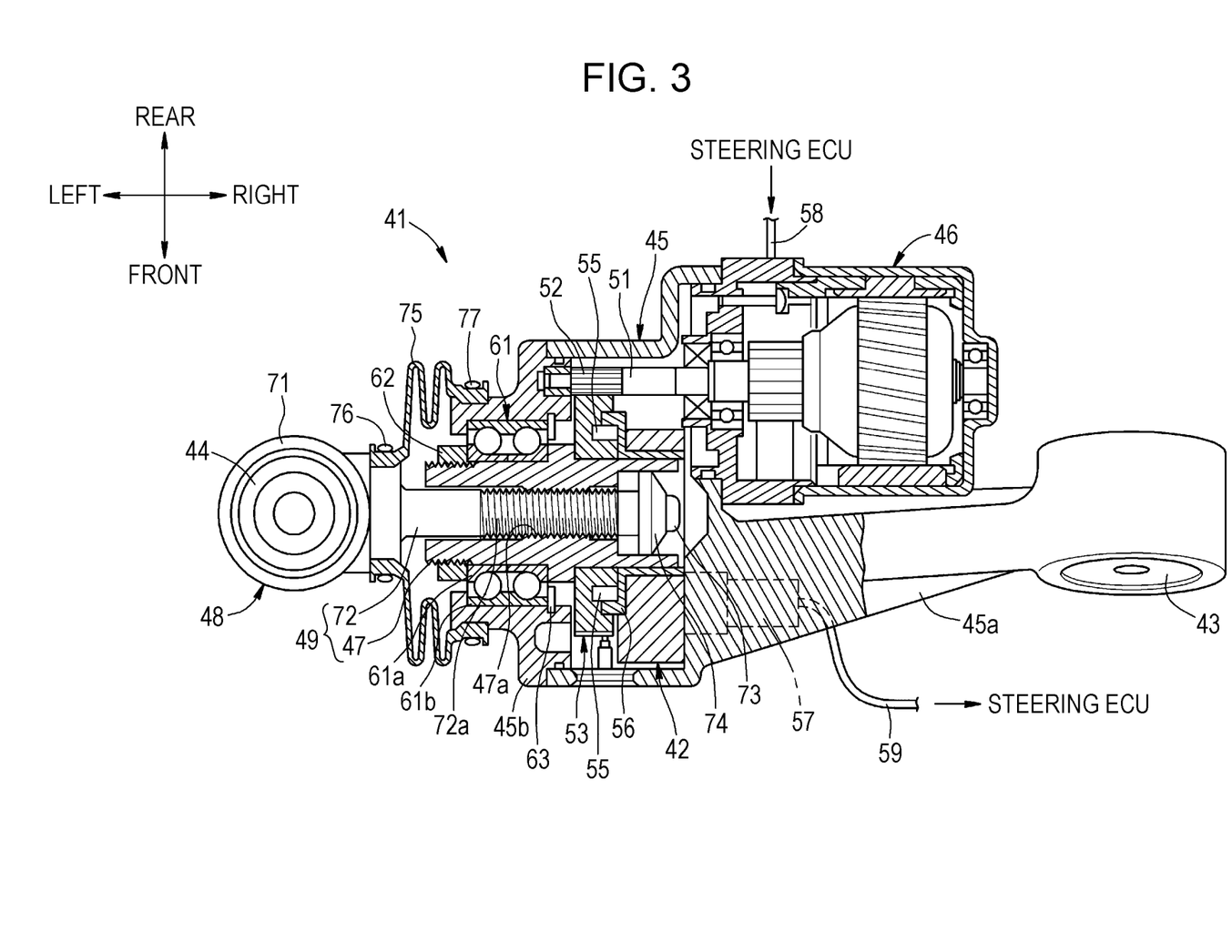
FIG. 3 is a vertical sectional view of a rear toe actuator according to the first embodiment.

As illustrated in FIG. 2, the rear suspension 4 is a double wishbone type, and includes an upper arm 25 and a lower arm 26 for vertically movably connecting the rear wheel knuckle 16 to the vehicle body 1, a damper 27 for connecting the rear wheel knuckle 16 to the vehicle body 1, and a spring 28 which is wound around the upper peripheral part of the damper 27. The rear wheel 3 is rotatably supported by the rear wheel knuckle 16, and is vertically moved along with the rear wheel knuckle 16.

Base ends of the upper arm 25 and the lower arm 26 are connected to the vehicle body 1 via rubber bushes 31, 32, respectively, and distal ends of the upper arm 25 and the lower arm 25 are connected to upper and lower portions of the rear wheel knuckle 16 via ball joints 33, 34, respectively. The base end of the rear toe actuator 41 is connected to the vehicle body 1 via a vehicle body side rubber bush 43, and the distal end of the rear toe actuator 41 is connected to a rear portion of the rear wheel knuckle 16 via a knuckle side rubber bush 44. The upper end of the damper 27 is connected to the vehicle body 1 is a rubber bush (not illustrated), and the lower end of the damper 27 is connected to an upper portion of the rear wheel knuckle 16 via a rubber bush 38.

[Rear Toe Actuator]

Next, the structure of the rear toe actuator 41 will be described with reference to FIG. 3. In the following description of the rear toe actuator 41, the front, rear, left, and right directions are indicated by respective arrows in FIG. 3, and a position and a direction are described in accordance with the arrows.

As illustrated in FIG. 3, the rear toe actuator 41 includes a housing 45 which constitutes the outer contour of the rear toe actuator 41, as well as a motor 45 held in the housing 45, a nut 47, and a rod 48. In the case of the present embodiment, the housing 45 includes a first housing half 45$a$ into which the vehicle body side rubber bush 43 is press-fitted at the right end of the first housing half 45$a$, and a second housing half 45$b$ which is secured to the first housing half 45$a$ via a bolt which is not illustrated.

The motor 46, which is drive-controlled by the steering ECU 7, is connected to a rear portion of the first housing half 45$a$, and a driven gear 53 to be engaged with a drive gear 52 formed on a shaft 51 of the motor 46 is housed in a front portion of the first housing half 45$a$, and the rotation sensor 42 is held at the right of the driven gear 53. The rotation sensor 42 is what is called an absolute rotary encoder, and includes a rotor 55 which is engaged with the driven gear 53 via a pair of pins 55, and a socket 57 which outputs a detected signal (rotation angle of the rotor 56) to the steering ECU 7. It is to be noted that a numeral 58 in FIG. 3 indicates a lead wire for supplying power to the motor 46 from the steering ECU 7, and a numeral 59 in FIG. 3 indicates a harness which connects the steering ECU 7 to the socket (the rotation sensor 42).

On the other hand, in the second housing half 45b, the nut 47 is rotatably held via a double row angular bearing 61, the nut 47 being fixed and integrated with the driven gear 53. On the axis of the nut 47, there is formed a female screw 47a into which a male screw 72a of the below-described screw shaft 72 is screwed, and the female screw 47a and the screw shaft 72 constitute a feed screw mechanism 49. In FIG. 3, the member indicated by a numeral 62 is a hexagon nut for securing the nut 47 to an inner ring 61a of the double row angular bearing 61, and the member indicated by a numeral 53 is a C-type retaining ring for fixing an outer ring 61b of the double row angular bearing 61 to the second housing half 45b.

The rod 48 includes a main body 71 into which the knuckle side rubber bush 44 is press-fitted, a screw shaft 72 extending from the right end of the main body 71, and a stopper 74 which is secured to the right end of the screw shaft 72 by a screw 73. In the screw shaft 72, there is formed a male screw 74a which is screwed into the female screw 47a of the nut 47. In addition, a rubber bellows 75 for preventing entry of water and dust is fixed between the right end of the main body 71 and the left end of the second housing half 45b by snap rings 76, 77.

Effect of First Embodiment

When the vehicle V is stared, the steering ECU 7 sets an assist torque for the front wheels 3fl, 3fr based on parameters including a steering angle and the vehicle speed, and outputs a driving current to the EPS motor 14. When the vehicle is turning, the steering ECU 7 sets target toe angles of the left and right rear wheels 3rl, 3rr, respectively based on parameters including a steering angle, the vehicle speed, and a yaw rate, outputs a driving current to the motor 46 of the rear toe actuators 41L, 41R, and performs feedback control based on signals detected by the rotation sensors 42L, 42R so as to reduce the difference between each target toe angle and the actual toe angle.

When the driving current is outputted to the motor 46, the driven gear 53 is driven to rotate in either forward or reverse direction by the drive gear 52 which is formed on the shaft 51 as illustrated in FIG. 3, and the nut 47 integrated with the driven gear 53 is also driven to rotate by the same rotation amount as the driven gear 53. Then, the screw shaft 72 (i.e., the rod 48) having the male screw 72a engaged with the female screw 47a of the nut 47 moves in either left or right direction, and the rear wheel knuckle 16 connected to the left end of the rod 48 swings around a virtual king pin L to line connecting the rotational centers of both ball joints 33, 34. see FIG. 2).

By adopting such a configuration, an operation of the rear toe actuator 41 in an expanding manner (leftward movement of the rod 48 from a neutral position) causes the rear portion of the rear wheel knuckle 16 to be rotated outward in the vehicle width direction, and the toe angle of the rear wheel 3 is inclined inward (in the toe-in direction) with respect to the driving direction of the vehicle. Conversely, an operation of the rear toe actuator 41 in a contracting manner (rightward movement of the rod 48 from the neutral position) causes the rear portion of the rear wheel knuckle 16 to be rotated inward in the vehicle width direction, and the toe angle of the rear wheel 3 is inclined outward (in the toe-out direction) with respect to the driving direction of the vehicle.

On the other hand, when the driven gear 53 rotates, the rotor 56 of the rotation sensor 42 which is engaged with the driven gear 53 via the pins 55 also rotates by the same rotation amount as the driven gear 53. Then, a detection signal according to the rotation amount of the rotor 56 (i.e., the rotation amount of the driven pear 53) is generated in the rotation sensor 42, and the detection signal is outputted to the steering ECU 7 via the harness 59.

The steering ECU 7 calculates the movement of the rod 48 from the neutral position (or the rotation amount of the driven gear 53) based on the detection signal of the rotation sensor 42, estimates the actual toe angle from the calculated movement, and performs feedback control so as to reduce the difference between the target toe angle and the actual toe angle.

In the present embodiment, the actual toe angle is estimated based on the rotation amount of the driven gear 53 in the above-described manner, and thus the problem of unstable feedback control due to looseness between the screw shaft 72 and the nut 47 included in the feed screw mechanism 49 is solved. That is to say, because the rotation sensor 42 detects a rotation amount (i.e., operation amount of the motor 46) of the driven gear 53, even when an external force is applied to the rear wheels in bad road conditions and the screw shaft 72 (i.e., the rod 48) moves relative to the nut 47 (i.e., the housing 45) in the axial direction by the degree of the looseness, the steering ECU 7 can perform stable feedback control irrespective of the movement. In the case of the present embodiment, the rotation sensor 42 detects rotation of the nut 47 included in the feed screw mechanism 49, and thus in contrast to the case where the rotation amount of the motor 46 is detected, accuracy in the estimation of the actual toe angle is improved.

Second Embodiment

Next, a second embodiment of the present disclosure will be described with reference to FIG. 4. Although the general configuration of the vehicle and the configuration of the rear wheel toe angle control mechanism in the second embodiment are the same as those of the above-described first embodiment, the configuration of a rear toe actuator and a rotation sensor are different from those of the first embodiment. In the following description of the present embodiment, the members having the same functions as those in the first embodiment are labeled with the same reference symbols and redundant description is omitted.

Figure 4:
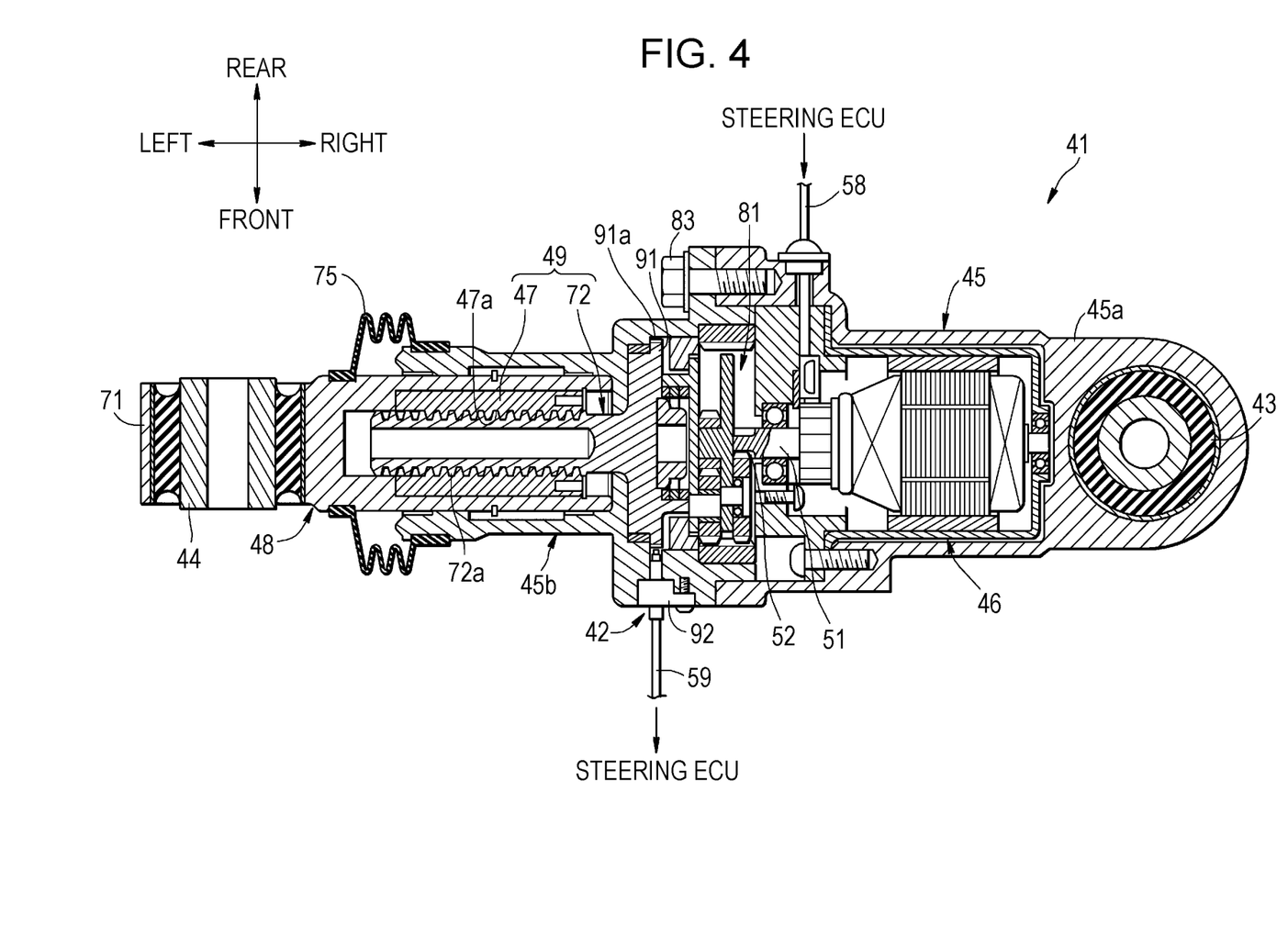
FIG. 4 is a vertical sectional view of a rear toe actuator according to a second embodiment.

As illustrated in FIG. 4, the rear toe actuator 41 in the second embodiment includes the housing 45 connected to the vehicle body; the rod 48 which is slidably held in the housing 45 and the left end of which is connected to the rear wheel knuckle 16 (see FIG. 2); the nut 47 which is fixed to the inside of the rod 40; the screw shaft 72 which is rotatably held in the housing 45 and is screwed into the nut 47 (that is to say, the screw shaft 72 and the nut 47 constitute the feed screw mechanism 49); and the motor 46 which drives the screw shaft 72 via a planetary gear deceleration mechanism 81.

The housing 45 includes the first housing half 45a into which the vehicle body side rubber bush 43 is press-fitted at the right end of the first housing half 45a, and the second housing half 45b which is secured to the first housing half 45a via a bolt 83. The first housing half 45a houses the motor 46 to be drive-controlled by the steering ECU 7, coaxially with the rod 48. The second housing half 45b houses the planetary gear deceleration mechanism 81, rotatably supports the right end of the screw shaft 72, and slidably holds the rod 48 in the axial direction.

In the case of the present embodiment, a sensor disc 91 is integrally formed with the right end of the screw shaft 72, the sensor disc 91 having an outer circumference on which a plurality of comb teeth 91a are formed, and an electromagnetic rotation detector 92 disposed in close proximity to the sensor disc 91 is attached to the second housing half 45b. The sensor disc 91 and the electromagnetic rotation detector 92 constitute the absolute rotation sensor 42. Similarly to the first embodiment, the detection signal of the rotation sensor 42 is outputted to the steering ECU 7 via the harness 59.

Effect of Second Embodiment

When the driving current is outputted to the motor 46, as illustrated in FIG. 4, the planetary gear deceleration mechanism 81 is driven to rotate in either forward or reverse direction by the drive gear 52 formed on the shaft 51, and a rotational force reduced by the planetary gear deceleration mechanism 81 is transmitted to the screw shaft 72. Then, the nut 47 (i.e., the rod 48) with the female screw 47a engaged with the male screw 72a of the screw shaft 72 moves in either left or right direction, and the rear wheel knuckle 16 connected to the left end of the rod 48 swings around the virtual king pin L (the line connecting the rotational centers of both ball joints 33, 34. see FIG. 2).

In the present embodiment, also, an operation of the rear toe actuator 41 in an expanding manner (leftward movement of the rod 48 from the neutral position) causes the rear portion of the rear wheel knuckle 16 to be rotated outward in the vehicle width direction, and the toe angle of the rear wheel 3 is inclined inward (in the toe-in direction) with respect to the driving direction of the vehicle. Conversely, an operation of the rear toe actuator 41 in a contracting manner (rightward movement of the rod 48 from the neutral position) causes the rear portion of the rear wheel knuckle 16 to be rotated inward in the vehicle width direction, and the toe angle of the rear wheel 3 is inclined outward (in the toe-out direction) with respect to the driving direction of the vehicle.

On the other hand, when the screw shaft 72 rotates, the comb teeth 91a of the sensor disc 91 are located closer to or away from the electromagnetic rotation detector 92, and thus a detection signal is outputted to the steering ECU 7 from the rotation sensor 42.

The steering ECU 7 calculates the movement of the rod 48 from the neutral position (or the rotation amount of the sensor disc 91 (i.e., the screw shaft 72)) based on the detection signal of the rotation sensor 42, estimates the actual toe angle from the calculated movement, and performs feedback control so as to reduce the difference between the target toe angle and the actual toe angle.

In the present embodiment, the actual toe angle is estimated based on the rotation amount of the sensor disc 91 (i.e., the screw shaft 72) in the above-described manner, and thus the problem of unstable feedback control due to looseness between the screw shaft 72 and the nut 47 included in the feed screw mechanism 49 is solved. That is to say, because the rotation sensor 42 detects a rotation amount of the sensor disc 91 (i.e., operation amount of the motor 46), even when an external force is applied to the rear wheels in bad road conditions and the nut 47 (i.e., the rod 40) moves relative to the screw shaft 72 (i.e., the housing 45) in the axial direction by the degree of the looseness, the steering ECU 7 can perform stable feedback control irrespective of the movement. In the case of the present embodiment, the rotation sensor 42 detects rotation of the screw shaft 72 included in the feed screw mechanism 49, and thus in contrast to the case where the rotation amount of the motor 46 is detected, accuracy in the estimation of the actual toe angle is improved.

In the above, specific embodiments have been described, however, the aspects of the present disclosure are not limited to those embodiments. For example, the rotation sensor detects rotation of the driven gear and the screw shaft in the both embodiments, however, in the case where a reduction gear or a planetary gear deceleration mechanism is interposed between the motor and the nut (or the screw shaft), the rotation sensor may detect rotation of the reduction gear or the planetary gear deceleration mechanism (such as an internal gear). In addition, the specific configuration of rear wheel toe angle variable mechanism and the rear toe actuator may be changed as needed without departing from the spirit of the present disclosure.

We claim:

1. A rear wheel toe angle variable vehicle comprising:
    a rear wheel support member;
    a rear wheel supported by the rear wheel support member;
    a rear toe actuator changing a toe angle of the rear wheel by an expanding operation or contracting operation of the rear toe actuator in an axial direction, the rear toe actuator comprising:
        a housing connected to one of the rear wheel support member and a vehicle body;
        a motor disposed in the housing;
        a rod connected to the other of the rear wheel support member and the vehicle body;
        a nut provided in one of the housing and the rod;
        a screw shaft provided in the other of the housing and the rod, the screw shaft and the nut constituting a feed screw mechanism;
        a rotation transmission unit disposed in the housing and configured to transmit rotation of the motor to the nut or the screw shaft to cause a relative positional change between the nut and the screw shaft in the axial direction; and
        a rotation amount detection unit configured to detect a rotation amount of one of the rotation transmission unit and the nut or the screw shaft to which the rotation is transmitted by the rotation transmission unit,
    wherein the rear wheel toe angle variable vehicle estimates an operation amount of the rear toe actuator using the amount detected by the rotation amount detection unit, and performs feedback control of the motor using the estimated operation amount.

2. The rear wheel toe angle variable vehicle according to claim 1,
    wherein the rotation transmission unit includes a driven gear engaged with a drive gear formed on a shaft of the motor.

3. The rear wheel toe angle variable vehicle according to claim 1,
    wherein the rod is connected to the rear wheel support member without a gear.

4. The rear wheel toe angle variable vehicle according to claim 1,
    wherein the rotation transmission unit includes a planetary gear deceleration mechanism driven by the drive gear.

5. The rear wheel toe angle variable vehicle according to claim 1,
    wherein the rotation amount detection unit is configured to detect the rotation amount of the rotation transmission unit.

6. The rear wheel toe angle variable vehicle according to claim 5,
    wherein the rotation amount detection unit is disposed in the housing adjacent to the rotation transmission unit.

7. A rear wheel toe angle variable vehicle comprising:
    a rear wheel support member;
    a rear wheel supported by the rear wheel support member;

a rear toe actuator changing a toe angle of the rear wheel by an expanding operation or contracting operation of the rear toe actuator in an axial direction, the rear toe actuator comprising:
- a housing connected to one of the rear wheel support member and a vehicle body;
- a motor disposed in the housing;
- a rod connected to the other of the rear wheel support member and the vehicle body;
- a nut provided in one of the housing and the rod;
- a screw shaft provided in the other of the housing and the rod, the screw shaft and the nut constituting a feed screw mechanism;
- a rotation transmission disposed in the housing and configured to transmit rotation of the motor to the nut or the screw shaft to cause a relative positional change between the nut and the screw shaft in the axial direction; and
- a rotation amount detector configured to detect a rotation amount of one of the rotation transmission and the nut or the screw shaft to which the rotation is transmitted by the rotation transmission, wherein the rear wheel toe angle variable vehicle estimates an operation amount of the rear toe actuator using the amount detected by the rotation amount detector, and performs feedback control of the motor using the estimated operation amount.

8. The rear wheel toe angle variable vehicle according to claim 7,
wherein the rotation transmission includes a driven gear engaged with a drive gear formed on a shaft of the motor.

9. The rear wheel toe angle variable vehicle according to claim 7,
wherein the rod is connected to the rear wheel support member without a gear.

10. The rear wheel toe angle variable vehicle according to claim 7,
wherein the rotation transmission includes a planetary gear deceleration mechanism driven by the drive gear.

11. The rear wheel toe angle variable vehicle according to claim 7,
wherein the rotation amount detector is configured to detect the rotation amount of the rotation transmission.

12. The wheel toe angle variable vehicle according to claim 11,
wherein the rotation amount detector is disposed in the housing adjacent to the rotation transmission.

13. A method of controlling rear wheel toe angle of a vehicle, the vehicle comprising:
- a rear wheel support member;
- a rear wheel supported by the rear wheel support member;
- a rear toe actuator changing a toe angle of the rear wheel by an expanding or contracting operation of the rear toe actuator in an axial direction, the rear toe actuator comprising:
  - a housing connected to one of the rear wheel support member and a vehicle body;
  - a motor disposed in the housing;
  - a rod connected to the other of the rear wheel support member and the vehicle body;
  - a nut provided in one of the housing and the rod;
  - a screw shaft provided in the other of the housing and the rod, the screw shaft and the nut constituting a feed screw mechanism; and
  - a rotation transmission disposed in the housing and configured to transmit rotation of the motor to the nut or the screw shaft to cause a relative positional change between the nut and the screw shaft in the axial direction, wherein the method comprises detecting, by a detector, a rotation amount of one of the rotation transmission and the nut or the screw shaft to which the rotation is transmitted by the rotation transmission, and
estimating, by a computer, an operation amount of the rear toe actuator using the amount detected by the detector, and performing feedback control of the motor using the estimated operation amount.

14. The method of controlling rear wheel toe angle of the vehicle according to claim 13, wherein the detecting step detects the rotation amount of the rotation transmission.

15. The method of controlling rear wheel toe angle of the vehicle according to claim 14, wherein the detector is disposed in the housing adjacent to the rotation transmission.

* * * * *